US012614247B2

(12) United States Patent
Yu et al.

(10) Patent No.: US 12,614,247 B2
(45) Date of Patent: Apr. 28, 2026

(54) REAL-TIME VOLUMETRIC RENDERING

(71) Applicant: SHANGHAITECH UNIVERSITY, Shanghai (CN)

(72) Inventors: Jingyi Yu, Shanghai (CN); Yuyao Zhang, Shanghai (CN); Xin Lou, Shanghai (CN); Qing Wu, Shanghai (CN); Chaolin Rao, Shanghai (CN); Jiawen Yang, Shanghai (SH)

(73) Assignee: SHANGHAITECH UNIVERSITY, Shanghai (CN)

( * ) Notice: Subject to any disclaimer, the term of this patent is extended or adjusted under 35 U.S.C. 154(b) by 169 days.

(21) Appl. No.: 18/574,044

(22) PCT Filed: Jan. 11, 2022

(86) PCT No.: PCT/CN2022/071388
§ 371 (c)(1),
(2) Date: Dec. 25, 2023

(87) PCT Pub. No.: WO2023/284275
PCT Pub. Date: Jan. 19, 2023

(65) Prior Publication Data
US 2024/0371078 A1     Nov. 7, 2024

(30) Foreign Application Priority Data

Jul. 12, 2021     (WO) ................ PCT/CN2021/105862

(51) Int. Cl.
*G06T 3/4046* (2024.01)
*G06T 3/4053* (2024.01)
(Continued)

(52) U.S. Cl.
CPC .......... *G06T 3/4046* (2013.01); *G06T 3/4053* (2013.01); *G06T 5/10* (2013.01);
(Continued)

(58) Field of Classification Search
CPC ..... G06T 11/00; G06T 3/4046; G06T 3/4053; G06T 5/10; G06T 5/50; G06T 5/60;
(Continued)

(56) References Cited

U.S. PATENT DOCUMENTS

| | | | | |
|---|---|---|---|---|
| 11,967,015 B2 * | 4/2024 | Shan | ...................... | G06N 3/045 |
| 2022/0301252 A1 * | 9/2022 | Wang | ..................... | G06N 3/048 |
| 2024/0242451 A1 * | 7/2024 | Yu | ............................ | G06T 7/70 |

FOREIGN PATENT DOCUMENTS

| | | |
|---|---|---|
| CN | 105844706 A | 8/2016 |
| CN | 108520513 A | 9/2018 |

(Continued)

OTHER PUBLICATIONS

Pumarola et al. D-NeRF: Neural Radiance Fields for Dynamic Scenes [Online]. Jun. 20, 2021 [Retrieved on Aug. 5, 2025]. Retrieved from the Internet: <URL: https://ieeexplore.ieee.org/document/9578753 > (Year: 2021).*

(Continued)

*Primary Examiner* — King Y Poon
*Assistant Examiner* — Michelle Hua Ma
(74) *Attorney, Agent, or Firm* — Bayramoglu Law Offices LLC

(57)     ABSTRACT

An image rendering system for rendering two-dimensional images in real-time. The image rendering system can receive an implicit representation model of a three-dimensional image. The image rendering system can construct, based on voxel coordinates, a three-dimensional image based on the implicit representation model. The image rendering system can rotate the three-dimensional image to an orientation in a computing space based on a user input. The image rendering system can generate a two-dimensional image based on the rotated three-dimensional image.

14 Claims, 7 Drawing Sheets

(51) Int. Cl.

| | |
|---|---|
| *G06T 5/10* | (2006.01) |
| *G06T 5/50* | (2006.01) |
| *G06T 5/60* | (2024.01) |
| *G06T 9/00* | (2006.01) |
| *G06T 15/08* | (2011.01) |
| *G06T 19/20* | (2011.01) |

(52) U.S. Cl.

CPC .................. *G06T 5/50* (2013.01); *G06T 5/60* (2024.01); *G06T 9/002* (2013.01); *G06T 15/08* (2013.01); *G06T 19/20* (2013.01); *G06T 2207/10061* (2013.01); *G06T 2207/10081* (2013.01); *G06T 2207/10088* (2013.01); *G06T 2207/20048* (2013.01); *G06T 2207/20081* (2013.01); *G06T 2207/20084* (2013.01); *G06T 2207/30016* (2013.01); *G06T 2210/21* (2013.01); *G06T 2210/41* (2013.01); *G06T 2219/2016* (2013.01)

(58) Field of Classification Search

CPC ......... G06T 9/002; G06T 15/08; G06T 19/20; G06T 2207/10061; G06T 2207/10081; G06T 2207/10088; G06T 2207/20048; G06T 2207/20081; G06T 2207/20084; G06T 2207/30016; G06T 2210/21; G06T 2210/41; G06T 2219/2016; G06T 15/20; G06T 3/14; G06T 3/4084; G06N 3/063; G06N 3/08; G06N 3/048; G06N 3/084

See application file for complete search history.

(56) References Cited

FOREIGN PATENT DOCUMENTS

| | | | | |
|---|---|---|---|---|
| KR | 20090116435 A | * | 11/2009 | ............ G06T 11/00 |
| WO | 2021158337 A2 | | 8/2021 | |

OTHER PUBLICATIONS

Zheng et al. Neural Light Field 3D Printing [Online]. Dec. 2020 [Retrieved on Aug. 5, 2025]. Retrieved from the Internet: <URL: https://aidam.mpi-inf.mpg.de/data/pdfs/nlf3dp.pdf > (Year: 2020).*

Mroz et al. Real-Time Maximum Intensity Projection [Online]. 1999 [Retrieved on Aug. 5, 2025]. Retrieved from the Internet: <URL: https://link.springer.com/chapter/10.1007/978-3-7091-6803-5_13 > (Year: 1999).*

Mildenhall et al. NeRF: Representing Scenes as Neural Radiance Fields for View Synthesis [Online]. Aug. 3, 2020 [Retrieved on Aug. 5, 2025]. Retrieved from the Internet: <URL: https://arxiv.org/abs/2003.08934 > (Year: 2020).*

Srivastava et al. Training Very Deep Networks [Online]. Nov. 23, 2015 [Retrieved on Aug. 7, 2025]. Retrieved from the Internet: <URL: https://arxiv.org/abs/1507.06228 > (Year: 2015).*

Daniel E. Worrall, et al., Interpretable Transformations with Encoder-Decoder Networks, 2017 IEEE International Conference on Computer Vision (ICCV), 2017, pp. 5737-5746.

Kyle Olszewski, et al., Transformable Bottleneck Networks, 2019 IEEE/CVF International Conference on Computer Vision (ICCV), 2019, pp. 7648-7657.

* cited by examiner

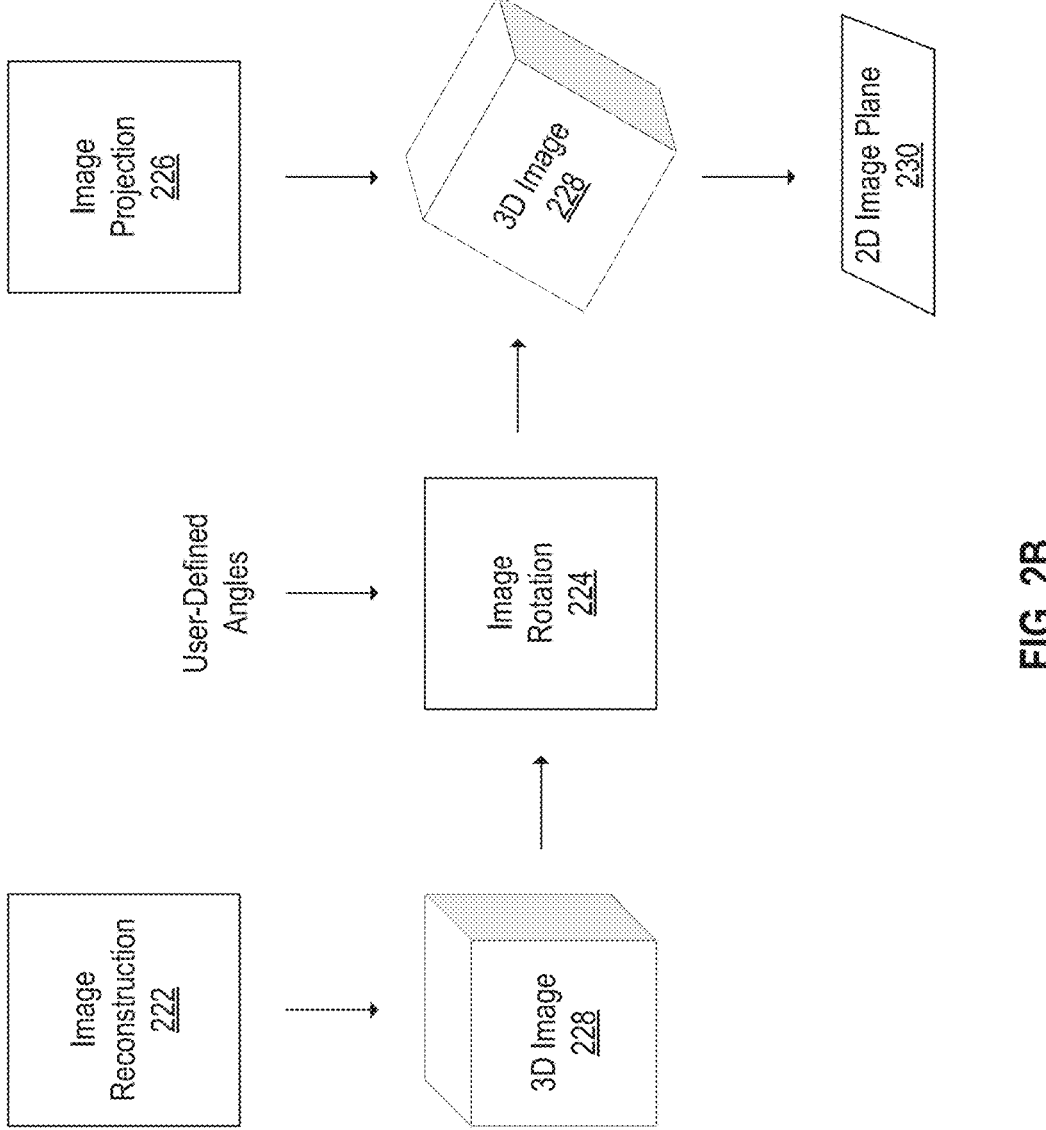
FIG. 2B

280

282

280a (100)
280b (50)
280c (120)
280d (130)
280e (20)
280f (40)
280g (100)

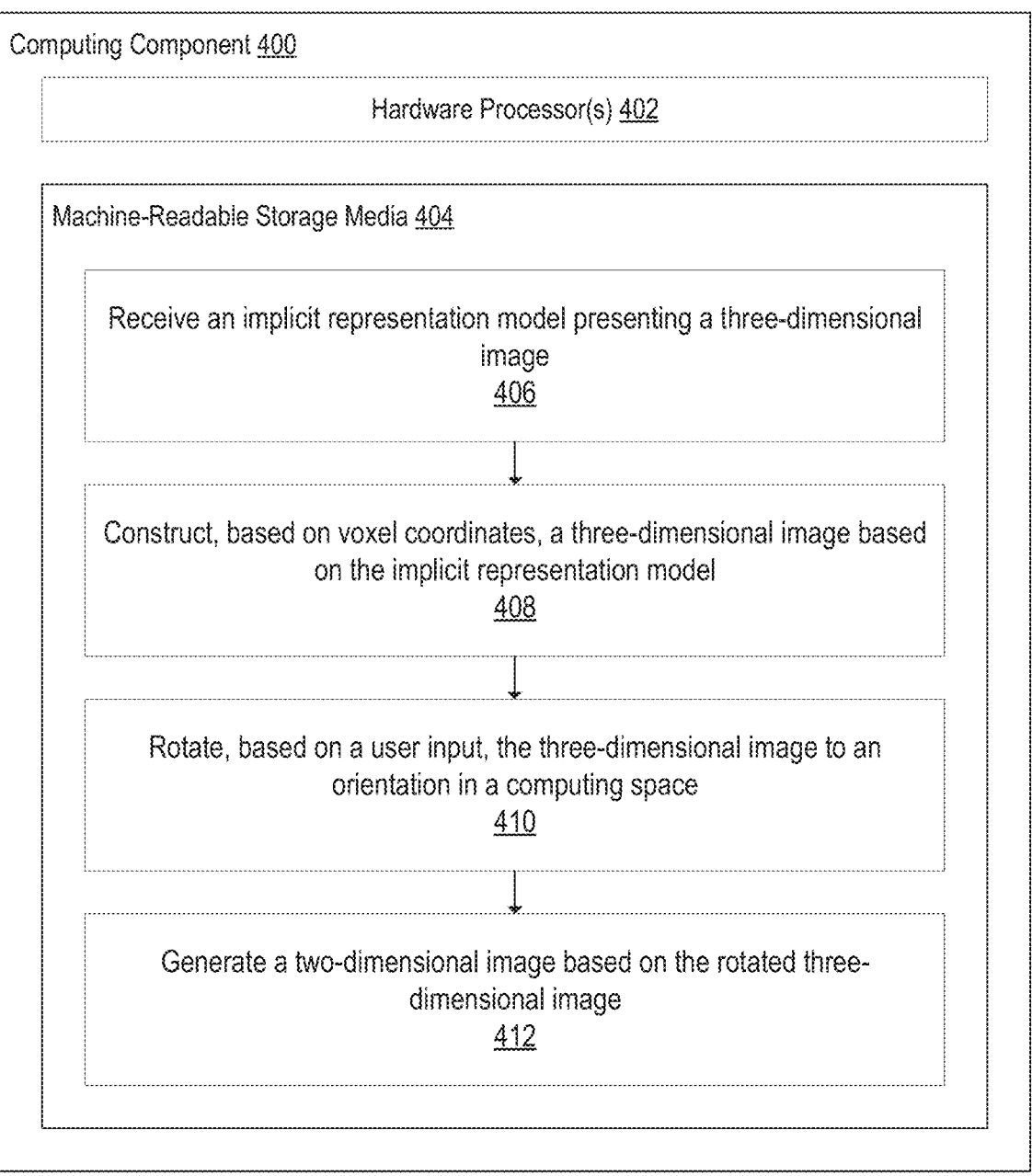

Computing Component 400

Hardware Processor(s) 402

Machine-Readable Storage Media 404

Receive an implicit representation model presenting a three-dimensional image
406

Construct, based on voxel coordinates, a three-dimensional image based on the implicit representation model
408

Rotate, based on a user input, the three-dimensional image to an orientation in a computing space
410

Generate a two-dimensional image based on the rotated three-dimensional image
412

REAL-TIME VOLUMETRIC RENDERING

CROSS REFERENCE TO RELATED APPLICATION

This application is the National Stage Entry of International Patent Application No. PCT/CN2022/071388, filed on Jan. 11, 2022, which is based on and claims priority to International Patent Application No. PCT/CN2021/105862, filed Jul. 12, 2021, the entire contents of which are incorporated herein by reference.

TECHNICAL FIELD

The present invention generally relates to image rendering. More particularly, the present invention relates to a computing system for performing neural network-based image rendering.

BACKGROUND

Image rendering techniques using machine learning models, such as neural networks, have been developed for rendering high-quality images. For example, neural radiance field (NeRF) techniques based on multi-layer perceptrons (MLPs) have been recently developed to render photorealistic images from novel viewpoints (i.e., perspectives). For instance, a NeRF of body tissue in three-dimensional imaging space can be trained using a training dataset comprising medical images (e.g., CT scans or MRI images) depicting the body tissue from various viewpoints. Once the NeRF is trained, an image of the body tissue in a novel viewpoint can be obtained, and the image of the body tissue can be rendered. In general, conventional methods of images rendering can have major drawbacks. First, computing resources required to store rendered images are proportional to resolution of the images. For example, as a general rule of thumb, the higher the resolution of a rendered image, the greater the file size of the rendered image. Second, often times, medical images have embedded within them personal identifying information of patients from which the medical images were taken. As such, privacy of patient cannot be protected as the medical images are explicitly stored. As such, better solutions are needed.

SUMMARY

Described herein is an image rendering system for rendering two-dimensional images in real-time. The image rendering system can receive an implicit representation model of a three-dimensional image. The image rendering system can construct, based on voxel coordinates, a three-dimensional image based on the implicit representation model. The image rendering system can rotate the three-dimensional image to an orientation in a computing space based on a user input. The image rendering system can generate a two-dimensional image based on the rotated three-dimensional image.

In some embodiments, the implicit representation model can be based on a neural network encoded with a neural radiance field. The neural network can comprise a multilayer perceptron.

In some embodiments, the neural network can comprise at least fifteen neural layers. Each neural layer can include a rectified linear unit layer. The neural network can include at least two dense connections that concatenate an input of the neural network to at least two neural layers.

In some embodiments, each neural layer can have at least one of 256 neurons or 512 neurons. The fifth neural layer and the eleventh neural layer of the neural network can have 512 neurons. The at least two dense connections can be concatenated to the fifth neural layer and the tenth neural layer.

In some embodiments, the image rendering sytem can generate, based on the user input, the three-dimensional image to an orientation in a computing space. The image rendering system can generate one or more rotational matrices to rotate the three-dimensional image. The image rendering system can rotate, based on the one or more rotational matrices, the three-dimensional image to the orientation in the computing space.

In some embodiments, the user input can comprise user-defined angles.

In some embodiments, the two-dimensional image can be generated in near real-time.

In some embodiments, the two-dimensional image can be generated based on a maximum intensity projection technique.

In some embodiments, the maximum intensity projection technique can comprise determining projection lines associated with the pixels of the two-dimensional image, determining, along a path of each projection line, a voxel in the three-dimensional image having a maximum intensity value, and utilizing maximum intensity values of voxels along paths of the projection lines as intensity values for the pixels of the two-dimensional image.

In some embodiments, the projection lines are determined based on a viewpoint of the two-dimensional image, and wherein the projection lines intersect voxels of the three-dimensional image.

These and other features of the apparatuses, systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2B illustrates a data pipeline associated with a real-time neural rendering system, according to various embodiments of the present disclosure.

FIG. 4 illustrates a computing component that includes one or more hardware processors and a machine-readable storage media storing a set of machine-readable/machine-executable instructions that, when executed, cause the hardware processor(s) to perform a method, according to various embodiments of the present disclosure.

Figure 1:
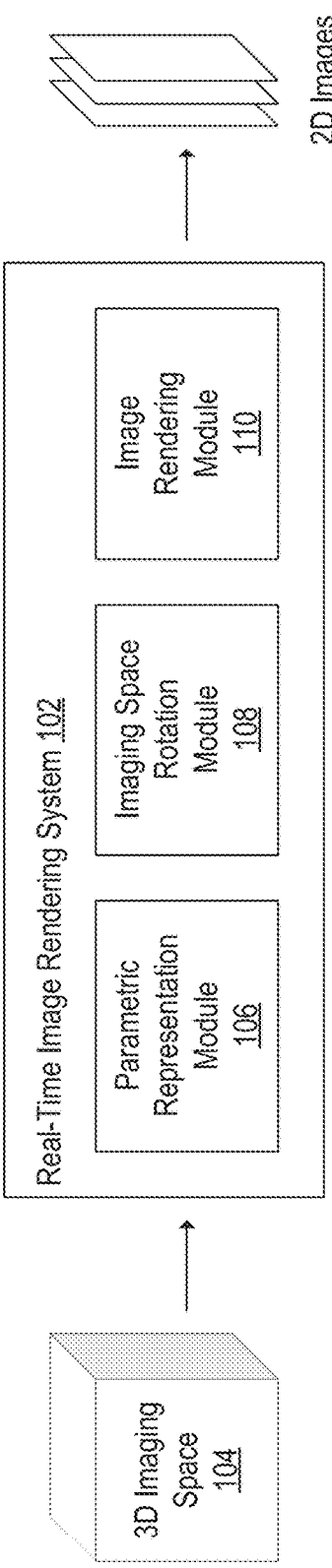
FIG. 1 illustrates a computing environment of a real-time neural rendering system, according to various embodiments of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION OF THE EMBODIMENTS

Provided herein are technical inventions that address problems arising from the conventional methods of image rendering discussed above. In various embodiments, an implicit neural representation can be used to represent a plurality of signals associated with image rendering. Compared with a discrete representation of image rendering, an implicit neural representation can be represented by a continuous and independent signal representing spatial resolution of an image. The continuous and independent signal can be parametrized as a continuous function that maps spatial coordinates of the image to responses of the continuous and independent signal. In this way, the continuous and independent function can be used to approximate a function representing a fully connected neural network (i.e., a multilayer perceptron) encoding a neural radiance field. In this way, the fully connected neural network can be represented as an implicit neural representation of an input signal for image rendering. These and other features of the technical inventions are discussed herein.

FIG. 1 illustrates a computing environment 100 of a real-time neural rendering system 102, according to various embodiments of the present disclosure. As shown in FIG. 1, in some embodiments, the computing environment 100 can include a three-dimensional imaging space 104. In some embodiments, the three-dimensional imaging space 104 can be a neural radiance field (NeRF) of an object, such as organs or body tissues. Based on the three-dimensional imaging space 104, the real-time neural rendering system 102 can render two-dimensional images in novel viewpoints. As shown in FIG. 1, in some embodiments, the real-time neural rendering system 102 can include a parametric representation module 106, an imaging space rotation module 108, and an image rendering module 110. Each of these modules will be discussed in further detail below.

In some embodiments, the parametric representation module 106 can be configured to encode the three-dimensional imaging space 104 based on a deep learning model, such as a multilayer preceptron model. The parametric representation module 106 can encode the three-dimensional imaging space 104 into a deep learning model. In the parametric representation model, the three-dimensional image 104 can be represented as a continuous and independent function (i.e., an implicit representation) of the three-dimensional imaging coordinate space. In this way, the parametric representation module 106 can encode the three-dimensional image104 into the deep learning model. The size of the parametric representation model is substantially less than the size of the three-dimension image, and the parametric representation can be used to naturally compress images to be rendered with a high compression rate. Moreover, such compression can be lossless. In some embodiments, the parametric representation module 106 can be further configured to protect private information of patients on images rendered through the real-time neural rendering system 102. In this context, protection of private information on an image means to encode the image into a plurality of parameters such that the private information identifying patients on the image is unreadable without rendering. Once the parametric representation module 106 encodes the three-dimensional imaging space 104, the parametric representation module 106 can be queried to output multiple channel intensity values of voxels of the three-dimensional imaging space 102 based on voxel coordinates. For example, a three-dimensional imaging space having a length of three voxels, a width of three voxels, and a height of three voxels can be encoded by the parametric representation module 106 into a multilayer perceptron. In this example, based on a voxel coordinate of (1,1,1) as an input to query the multilayer perceptron, the parametric representation module 106 can output multiple channel intensity values of a voxel at location (1,1,1) of the three-dimensional imaging space. The parametric representation module 106 will be discussed in further detail in reference to FIGS. 2A and 2B herein.

In some embodiments, the imaging space rotation module 108 can be configured to rotate the three-dimensional imaging space 104 to an orientation specified by user-defined angles. The imaging space rotation module 108 can generate, based on the user-defined angles, rotational (or transformation) matrices to rotate the three-dimensional imaging space 104 in free space (i.e., a computing space or a vector space). In some embodiments, the rotational or transformation matrices can operate voxel-by-voxel on voxels of the three-dimensional imaging space 104 in the free space in accordance with the rotational matrices. The imaging space rotation module 108 will be discussed in further detail in reference to FIG. 2B herein.

In some embodiments, the image rendering module 110 can be configured to generate projection lines (e.g., projections) originating from a two-dimensional image to be rendered. These projection lines can be projected (or injected) into the rotated three-dimensional imaging space 104. Based on multiple channel intensity values of voxels along each projection lines, the image rendering module 110 can generate the two-dimensional image. The imaging space rotation module 108 will be discussed in further detail in reference to FIG. 2B herein.

Figure 2A:
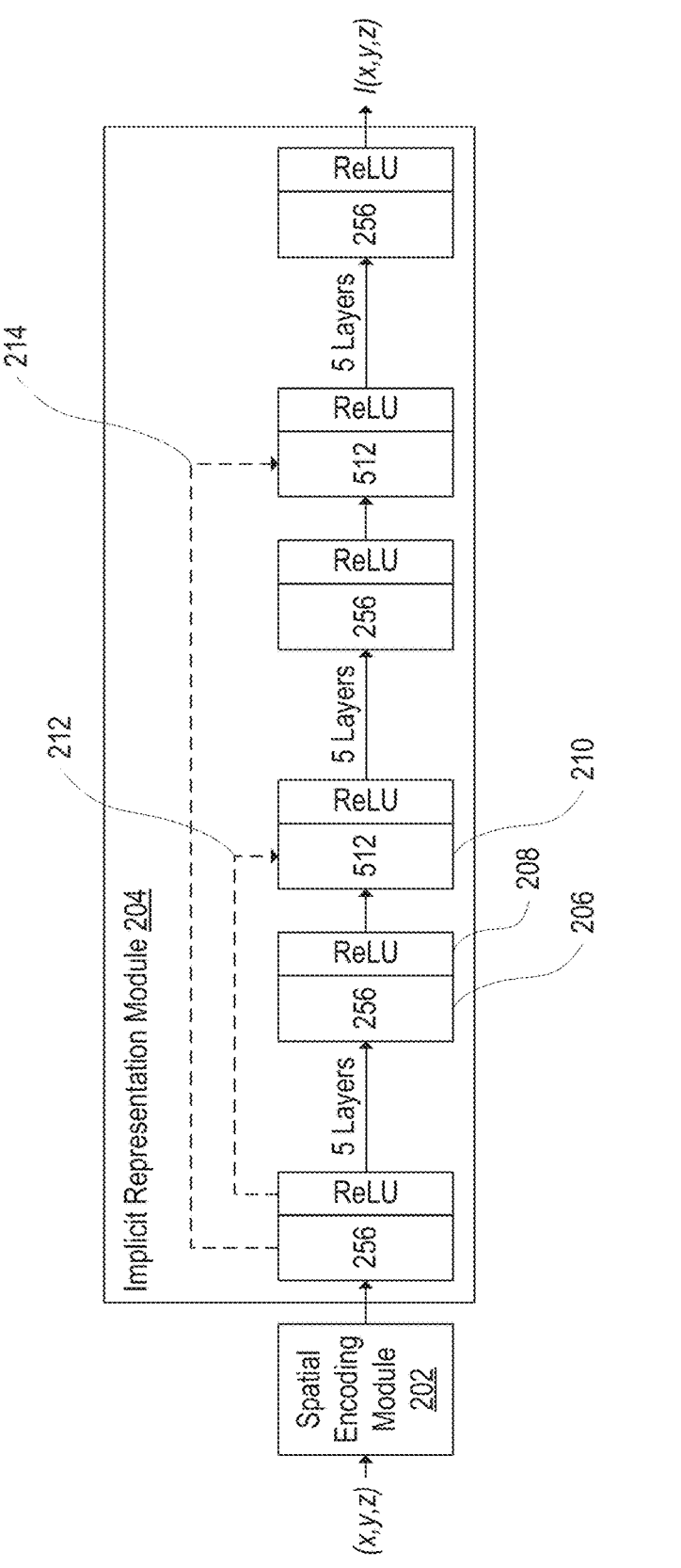
FIG. 2A illustrates a parametric representation module, according to various embodiments of the present disclosure.

FIG. 2A illustrates a parametric representation module 200, according to various embodiments of the present disclosure. In various embodiments, the parametric presentation module 106 of FIG. 1 can be implemented as the parametric representation module 200. As discussed above, the parametric representation module 200 can be configured to encode a three-dimensional imaging space (e.g., the three-dimensional imaging space 104 of FIG. 1) based on a machine learning model. Also discussed above, in some embodiments, the parametric representation module 200 can include a parametric representation model (i.e., an implicit representation) for encoding the three-dimensional imaging space. In such embodiments, the parametric representation model can be represented by a continuous implicit voxel function as follows:

$$F : \vec{x} \rightarrow I(\vec{x})$$

where $\vec{x}$ denotes three-dimensional voxel coordinates of the three-dimensional imaging space, and $I(\vec{x})$ denotes multiple channel intensity values of voxels at location $\vec{x}$ in an image I. In some embodiments, the voxel coordinates can be expressed in Cartesian coordinates. For example, $\vec{x}$ in the continuous implicit voxel function can be expressed as $\vec{x} = (x, y, z)$, where x, y, and z represent coordinates in the x-axis, y-axis, and z-axis of the three-dimensional imaging space, respectively. In some embodiments, the continuous implicit voxel function F can be approximated by a neural network with a Fourier feature mapping function. Such an approximation for the continuous implicit voxel function is feasible because (1) a size of the neural network is generally smaller than the image I, and (2) the image I is implicitly represented by the neural network. As such, to model the continuous implicit voxel function, the parametric representation module 200 can include a spatial encoding module 202 coupled to implicit representation module 204. The spatial encoding module 202 can be configured to perform functions of the Fourier feature mapping function. The implicit representation module 204 can be configured to perform functions of the neural network. In various embodiments, the spatial encoding module 202 and the implicit representation module 204 can be implemented on or as part of a computing system. For example, the spatial encoding module 202 and the implicit representation module 204 can be implemented on specialized computing hardware (e.g., computing systems with application-specific integrated circuits or field-programmable gate arrays). As another example, the spatial encoding module 202 and the implicit representation module 204 can be implemented on general computing hardware (e.g., computing systems with central processing units or graphics processing units) with specialized instructions or programs running on the general computing hardware. Many variations are possible. One particular hardware implementation of the parametric representation module 200, including the spatial encoding module 202 and the implicit representation module 204, will be discussed in reference to FIG. 3 herein.

In some embodiments, the spatial encoding module 202 can be configured to map low-dimensional inputs to a higher dimensional space. In this way, the implicit representation module 204 can train a machine learning model, such as a multilayer preceptron or a deep learning model, to learn high-frequency features of images. In general, high-frequency features of an image are details of objects depicted in the images. These details can include, for example, hair or fur of the objects, or any other details in which conventional imaging rendering methods may have difficulties during rendering. In some embodiments, the spatial encoding module 202 can be implemented to perform computations associated with a Fourier feature mapping function. In various embodiments, the Fourier feature mapping function can be expressed as follows:

$$\gamma(x) = [\cos(2\pi \mathcal{B}x), \sin(2\pi \mathcal{B}x)]^T$$

where x denotes voxel coordinates of the three-dimensional imaging space, and $\mathcal{B} \in \mathbb{R}^{L \times 3}$ is a gaussian matrix comprising voxels sampled from the three-dimensional imaging space. Each element of the gaussian matrix can be sampled from a gaussian distribution N(0,1). L is dimensions of voxel coordinates after the three-dimensional imaging space is encoded into the machine learning model.

In some embodiments, the implicit representation module 204 can be configured to encode the three-dimensional imaging space into a machine learning model. In some embodiments, the machine learning model can be a fully connected neural network (e.g., a multilayer perceptron) comprising fifteen fully connected neural layers. Each of the fifteen fully connected neural layers can be followed by a rectified linear unit (ReLU). In general, a ReLU can be configured to provide a ramping function to an input of a neural layer of a neural network. For example, consider the fully connected neural network of the implicit representation module 204 as shown in FIG. 2A. In this example, a first neural layer 206 of the fully connected neural network can be followed by a first ReLU 208. In this example, the first ReLU 208 can be configured to ramp an output of the first neural layer 206 to either a zero or a linear ramp output prior to providing the output, as an input, to a second neural layer 210 of the fully-connected neural network. In general, ReLUs coupled to the fifteen fully connected neural layers can act as an activation function to accelerate training of the fully connected neural network to encode the three-dimensional imaging space into the fully connected neural network. In one particular implementation of the fully-connected neural network, as shown in FIG. 2A, the sixth neural layer and the eleventh neural layer of the fully-connected neural network can comprise 512 neurons (i.e., perceptrons), while other neural layers of the fully-connected neural network can comprise 256 neurons. Other implementations are also possible. For example, in another implementation, all neural layers of the fully connected neural network can comprise either 256 or 512 neurons. In some embodiments, to ease training (i.e., encoding) of the fully connected neural network, the fully connected neural network can further include at least two dense connections. In general, a dense connection of a neural network is a type of neural layer that uses a linear operation. In such an operation, every input to a neural layer to connected to every output of a prior neural layer. In one particular implementation of the fully connected neural network, as shown in FIG. 2A, a first dense connection 212 can concatenate an input to the sixth neural layer of the fully-connected neural network and a second dense connection 214 can concatenate an input to the eleventh neural layer of the fully-connected neural network.

FIG. 2B illustrates a data pipeline 220 associated with a real-time neural rendering system, according to various embodiments of the present disclosure. In various embodiments, the real-time neural rendering system 102 of FIG. 1 can be configured to execute the data pipeline 220. As discussed above, the real-time neural rendering system can be configured to encode a three-dimensional imaging space (e.g., the three-dimensional imaging space 104 of FIG. 1) into a machine learning model. Once encoded, the machine learning model can be queried, based on voxel coordinates, to output multiple channel intensity values of the three-dimensional imaging space. Also discussed above, the real-time neural rendering system can be further configured to rotate the three-dimensional imaging space to an orientation specified by user-defined angles in free space (i.e., a computing space or a vector space). Once rotated, the real-time neural rendering system can generate projections into the rotated three-dimensional imaging space to generate two-dimensional images at that orientation. As shown in FIG. 2B, the data pipeline 220 can comprise an image reconstruction step 222, an image rotation step 224, and an image projection step 226. Each one of these steps will be discussed in further detail below.

In the image reconstruction step 222, a parametric representation module (e.g., the parametric representation module 106 of FIG. 1) of the real-time neural rendering system can reconstruct a three-dimensional image 228 based on the implicit representation model encoded with the three-dimensional imaging space (e.g., a NeRF). The parametric representation module can reconstruct the three-dimensional image 228 based on multiple channel intensity values of voxels of the three-dimensional imaging space. The multiple channel intensity values of the voxels can be obtained by querying voxel coordinates through the machine learning model. Once the multiple channel intensity values of the voxels are obtained, the parametric representation module can reconstruct the three-dimensional image 228.

In the image rotation step 224, an imaging space rotation module (e.g., the imaging space rotation module 108 of FIG. 1) of the real-time neural rendering system can rotate the three-dimensional image 228 to a particular orientation in free space. The imaging space rotation module can rotate the three-dimensional image 228 to the particular orientation based on user-defined angles. Based on the user-defined angles, the imaging space rotation module can generate rotational (or transformation) matrices with which to rotate the three-dimensional image 228 in the free space. For example, let $\psi$, $\theta$ and $\phi$ represent user-defined angles. Further, in this example, c represents voxel coordinates of the three-dimensional image 228. Based on the user-defined angles, the imaging space rotation module can generate three rotational matrices, or one rotational matrix for each axis of the three-dimensional image 228, as shown below:

$$Rx(\psi) = \begin{bmatrix} 1 & 0 & 0 \\ 0 & \cos\psi & -\sin\psi \\ 0 & \sin\psi & \cos\psi \end{bmatrix},$$

$$Ry(\theta) = \begin{bmatrix} \cos\theta & 0 & \sin\theta \\ 0 & 1 & 0 \\ -\sin\theta & 0 & \cos\theta \end{bmatrix}, Rz(\phi) = \begin{bmatrix} \cos\phi & -\sin\phi & 0 \\ \sin\phi & \cos\phi & 0 \\ 0 & 0 & 1 \end{bmatrix}$$

where Rx ($\psi$) is the rotational matrix for the x-axis, Ry ($\theta$) is the rotational matrix for the y-axis, and Rz ($\phi$) is the rotational matrix for the z-axis. These rotational matrices can operate on each voxel of the three-dimensional image 228 to rotate each voxel in the free space in accordance with the user-defined angles embedded in the rotational matrices. In this way, the three-dimensional image 228 can be rotated from its original orientation to the particular orientation defined by the user-defined angles. As such, it follows that voxel coordinates of the three-dimensional image 228 in the particular orientation defined by the user-defined angles can be defined as follows:

$$c' = c \cdot Rx(\psi)Ry(\theta)Rz(\phi)$$

where c represents the voxel coordinates of the three-dimensional image 228 in the particular orientation defined by the user-defined angles.

Figure 2C:
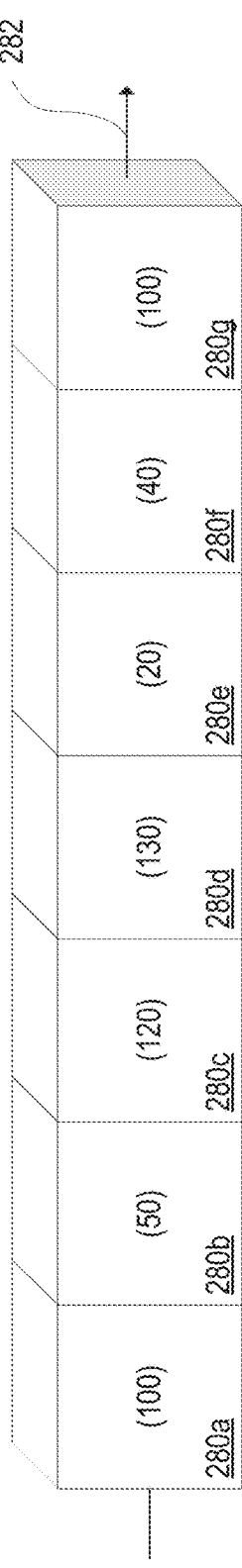
FIG. 2C illustrates a row of voxels of a three-dimensional imaging space intersected by a projection line originating from a pixel of a two-dimensional image to be rendered, according to various embodiments of the present disclosure.

In the image projection step 226, an image rendering module (e.g., the image rendering module 110 of FIG. 1) of the real-time neural rendering system can generate projection lines (e.g., projections) originating from a two-dimensional image to be rendered. These projection lines can be projected (or injected) into the rotated three-dimensional image 228 and onto a two-dimensional image plane 230. Based on multiple channel intensity values of voxels along each projection line projected through the rotated three-dimensional image 228, the image rendering module can generate the two-dimensional image. In some embodiments, the image rendering module can generate the two-dimensional image based on a maximum intensity projection (MIP) technique. A MIP technique is a method for generating two-dimensional images from a three-dimensional image (or imaging space) by selecting a voxel with the maximum intensity value along a projection line originating from a pixel of a two-dimensional image to be rendered. For example, consider FIG. 2C. FIG. 2C illustrates a row of voxels 280 of a three-dimensional imaging space intersected by a projection line 282 originating from a pixel of a two-dimensional image to be rendered, according to various embodiments of the present disclosure. As shown in FIG. 2C, the row of voxels 280 can comprise voxels 280a, 280b, 280c, 280d, 280e, 280f, and 280g with intensity values 100, 50, 120, 130, 20, 40, and 100, respectively. In this example, under the MIP technique, an intensity value of the pixel of the two-dimensional image would correspond to the intensity value of voxel 280d which is 130. This is because voxel 280d has the highest intensity value among the voxels intersected by the projection line 282. As such, using the MIP technique, the image rendering module can reconstruct the two-dimensional image by determining maximum intensity values of voxels that correspond to pixels of the two-dimensional image.

Figure 3:
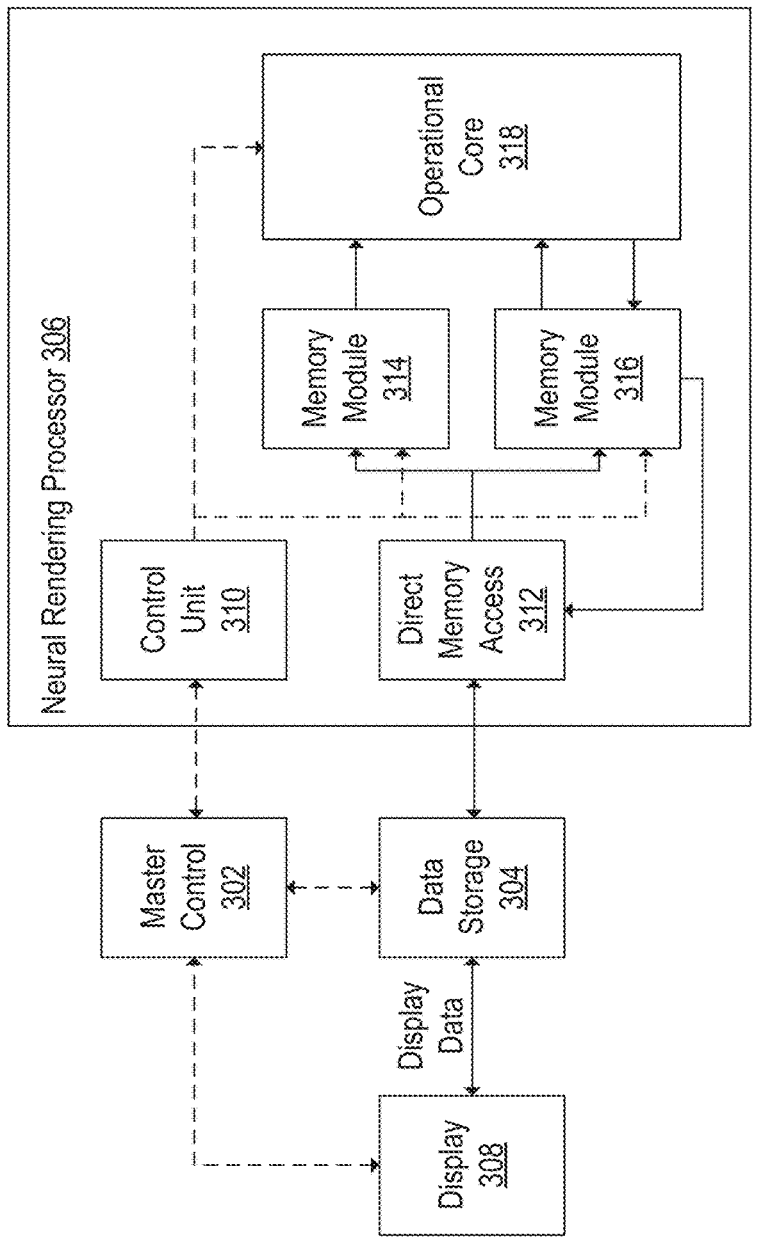
FIG. 3 illustrates a hardware implementation of a real-time neural rendering system, according to various embodiments of the present disclosure.

FIG. 3 illustrates a hardware implementation 300 of a real-time neural rendering system, according to various embodiments of the present disclosure. In some embodiments, the real-time neural rendering system 102 of FIG. 1 can be implemented using the hardware implementation 300. As shown in FIG. 3, the real-time neural rendering system can include a master control 302, a data storage 304, a neural rendering processor 306, and a display 308. Each of these components will be discussed in further detail below.

In some embodiments, the master control 302 can be configured to generate image rendering tasks and send instructions for the image rendering tasks to the neural rendering processor 306 for processing. In various embodiments, the master control 302 can be implemented using a microcontroller.

In some embodiments, the data storage 304 can be configured to store parameters associated with a machine learning model, such as a multilayer preceptron or a deep learning model, encoded with a three-dimensional imaging space. Computing functions relating to the machine learning model can be performed by the neural rendering processor 306. In some embodiments, the data storage unit 304 can be configured to store input and output data associated with the machine learning model as the neural rendering processor 306 renders two-dimensional images. Upon completion of image rendering, the neural rendering processor 306 stores the rendered images back to the data storage 304. At this time, the master control 302 can instruct the display 308 to retrieve display data relating to the rendered images and display the rendered images onto the display 308.

In some embodiments, the neural rendering processor 306 can be configured to execute a data pipeline (e.g., the data pipeline 220 of FIG. 2B) to render two-dimensional images. As shown in FIG. 3, the neural rendering processor 306 can include a control unit 310, a direct memory access 312, two memory modules 314, 316, and an operational core 318. The control unit 310 can receive the instructions for the image rendering tasks from the master control 302 and converts these instructions to an instruction set compatible with the two memory modules 314, 316, and the operational core 318. For example, in some embodiments, the control unit 310 can convert instructions received from the master control 302 into machine-language instructions for the operational core 306 to render two-dimensional images. The direct memory access 312 can allow for high-bandwidth, high-efficiency access to parameters of the machine learning model. The direct memory access 312 can further allow for high-bandwidth, high-efficiency writing to store rendered images to the data storage 304. In this way, time needed for images rendering can be reduced. Once the direct memory access 312 retrieves the parameters, the direct memory access 312 can store the parameters to the memory module 314, which can in turn be accessed by the operational core 318. The memory module 316 can store input and output data of the machine learning model while the operational core 318 renders two-dimensional images. Once the operational core 318 finishes image rendering, the operational core 318 stores data relating to the rendered image to the memory module 316. At this time, the direct memory access 312 relays this data to the data storage 304 for storage and display. In various embodiments, the operational core 318 can include a computational unit responsible for multiplication and accumulation (MAC) operations. In some embodiments, the operational core 318 can further include a computational unit responsible for activation operations. In some embodiments, the operational core 318 can additionally include a computational unit responsible for quantization operations. Many computational units are contemplated. For example, in some embodiments, the operational core 318 can further include a computational unit responsible for rendering operations.

FIG. 4 illustrates a computing component 400 that includes one or more hardware processors 402 and a machine-readable storage media 404 storing a set of machine-readable/machine-executable instructions that, when executed, cause the hardware processor(s) 402 to perform a method, according to various embodiments of the present disclosure. The computing component 400 may be, for example, the computing system 500 of FIG. 5. The hardware processors 402 may include, for example, the processor(s) 504 of FIG. 5 or any other processing unit described herein. The machine-readable storage media 404 may include the main memory 506, the read-only memory (ROM) 508, the storage 510 of FIG. 5, and/or any other suitable machine-readable storage media described herein.

At block 406, the processor 402 can receive an implicit representation of a three-dimensional image.

At block 408, the processor 402 can construct, based on voxel coordinates, a three-dimensional image based on the implicit representation model.

At block 410, the processor 402 can rotate, based on a user input, the three-dimensional image to an orientation in a computing space.

At block 412, the processor 402 can generate a two-dimensional image based on the rotated three-dimensional image.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 5:
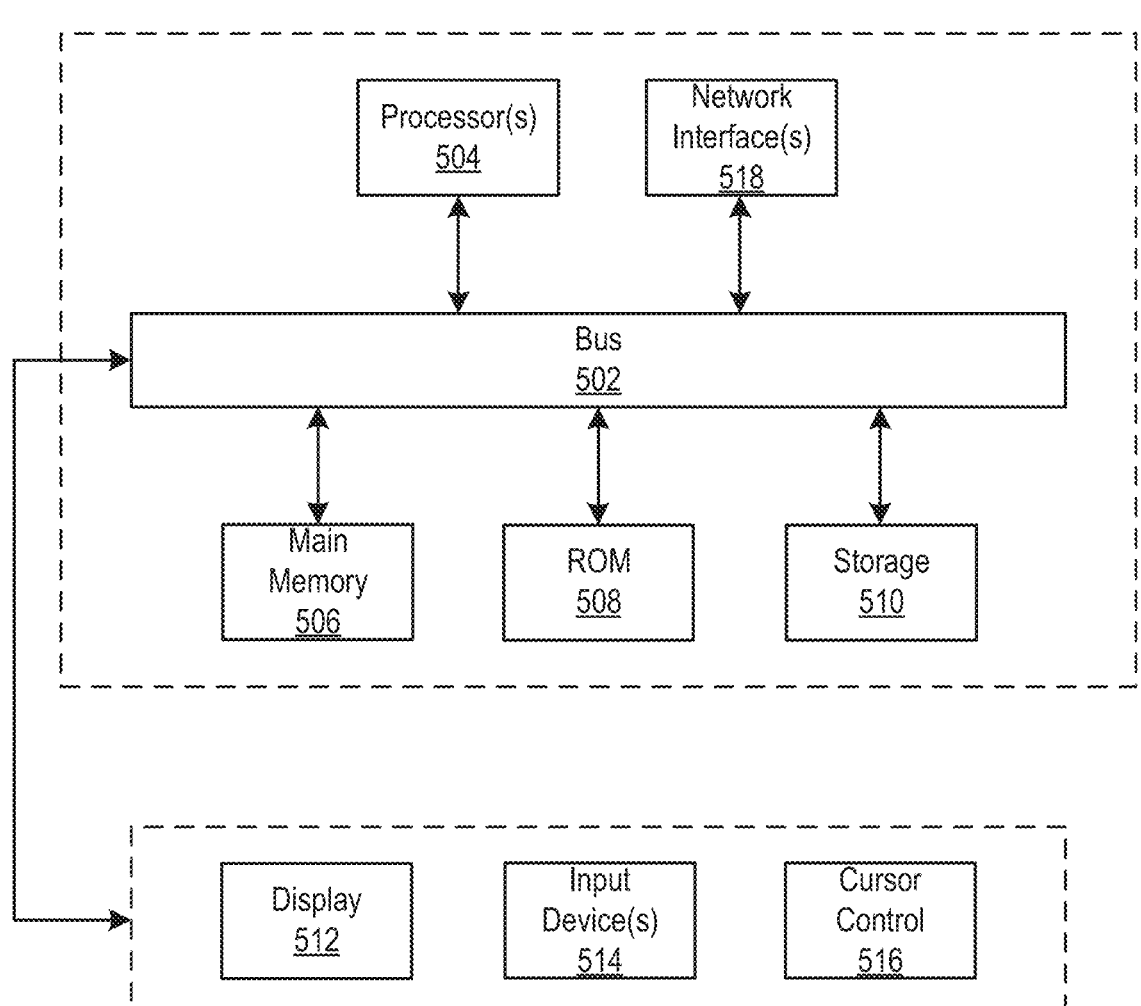
FIG. 5 is a block diagram that illustrates a computer system upon which any of various embodiments described herein may be implemented.

FIG. 5 is a block diagram that illustrates a computer system 500 upon which any of various embodiments described herein may be implemented. The computer system 500 includes a bus 502 or other communication mechanism for communicating information, one or more hardware processors 504 coupled with bus 502 for processing information. A description that a device performs a task is intended to mean that one or more of the hardware processor(s) 504 performs.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516. The computer system 500 also includes a communication interface 518 coupled to bus 502.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

What we claim is:

1. A computer-implemented method, comprising:

modeling, by a computer system, a three-dimensional image by a continuous implicit voxel function using an implicit representation model;

training the implicit representation model using the three-dimensional image;

transmitting the implicit representation model to an image rendering system;

reconstructing, by the image rendering system, based on voxel coordinates, the three-dimensional image based on the implicit representation model;

rotating, by the image rendering system, based on a user input, the three-dimensional image to an orientation in a computing space; and generating, by the image rendering system, a two-dimensional image based on the rotated three-dimensional image, wherein the implicit representation model is based on a neural network encoded with a neural radiance field, and wherein the neural network comprises a multilayer perceptron, wherein the neural network comprises at least fifteen neural layers, wherein each neural layer includes a rectified linear unit layer, and wherein the neural network includes at least two dense connections that concatenate an input of the neural network to at least two neural layers, and wherein each neural layer has at least one of 256 neurons or 512 neurons, wherein the fifth neural layer and the eleventh neural layer of the neural network have 512 neurons, and wherein the at least two dense connections are concatenated to the fifth neural layer and the tenth neural layer.

2. The computer-implemented method of claim 1, wherein the rotating of the three-dimensional image to the orientation in the computing space comprises:

generating, based on the user input, one or more rotational matrices to rotate the three-dimensional image; and rotating, based on the one or more rotational matrices, the three-dimensional image to the orientation in the computing space.

3. The computer-implemented method of claim 2, wherein the user input comprises user-defined angles.

4. The computer-implemented method of claim 1, wherein the two-dimensional image is generated based on a maximum intensity projection technique.

5. The computer-implemented method of claim 4, wherein the maximum intensity projection technique comprises:

determining projection lines associated with the pixels of the two-dimensional image;

determining, along a path of each projection line, a voxel in the three-dimensional image having a maximum intensity value; and utilizing maximum intensity values of voxels along paths of the projection lines as intensity values for the pixels of the two-dimensional image.

6. The computer-implemented method of claim 5, wherein the projection lines are determined based on a viewpoint of the two-dimensional image, and wherein the projection lines intersect voxels of the three-dimensional image.

7. The computer-implemented method of claim 1, wherein a size of the implicit representation model is less than a size of the three-dimensional image.

8. An image rendering system comprising:

at least one processor; and a memory storing instructions that, when executed by the at least one processor, cause the image rendering system to perform:

receiving an implicit representation model representing of a three-dimensional image;

constructing, based on voxel coordinates, the three-dimensional image based on the implicit representation model;

rotating, based on a user input, the three-dimensional image to an orientation in a computing space; and generating a two-dimensional image based on the rotated three-dimensional image, wherein the implicit representation model is based on a neural network encoded with a neural radiance field, and wherein the neural network comprises a multilayer perceptron, wherein the neural network comprises at least fifteen neural layers, wherein each neural layer includes a rectified linear unit layer, and wherein the neural network includes at least two dense connections that concatenate an input of the neural network to at least two neural layers, and wherein each neural layer has at least one of 256 neurons or 512 neurons, wherein the fifth neural layer and the eleventh neural layer of the neural network have 512 neurons, and wherein the at least two dense connections are concatenated to the fifth neural layer and the tenth neural layer.

9. The image rendering system of claim 8, wherein the rotating of the three-dimensional image to the orientation in the computing space comprises:

generating, based on the user input, one or more rotational matrices to rotate the three-dimensional image; and rotating, based on the one or more rotational matrices, the three-dimensional image to the orientation in the computing space.

10. The image rendering system of claim 9, wherein the user input comprises user-defined angles.

11. The image rendering system of claim 8, wherein the two-dimensional image is generated in near real-time.

12. The image rendering system of claim 8, wherein the two-dimensional image is generated based on a maximum intensity projection technique.

13. The image rendering system of claim 12, wherein the maximum intensity projection technique comprises:

determining projection lines associated with the pixels of the two-dimensional image;

determining, along a path of each projection line, a voxel in the three-dimensional image having a maximum intensity value; and utilizing maximum intensity values of voxels along paths of the projection lines as intensity values for the pixels of the two-dimensional image.

14. The image rendering system of claim 13, wherein the projection lines are determined based on a viewpoint of the two-dimensional image, and wherein the projection lines intersect voxels of the three-dimensional image.

\* \* \* \* \*